US012808295B2

(12) United States Patent
Khan et al.

(10) Patent No.: US 12,808,295 B2
(45) Date of Patent: Nov. 24, 2026

(54) SYSTEM AND METHOD FOR EFFECTIVE HYDROCARBON RESERVOIR PRESSURE PREDICTION AND CONTROL

(71) Applicant: Abu Dhabi National Oil Company, Abu Dhabi (AE)

(72) Inventors: Muhammad Navaid Khan, Abu Dhabi (AE); Abdul Ravoof Shaik, Abu Dhabi (AE)

(73) Assignee: Abu Dhabi National Oil Company, Abu Dhabi (AE)

( * ) Notice: Subject to any disclaimer, the term of this patent is extended or adjusted under 35 U.S.C. 154(b) by 1125 days.

(21) Appl. No.: 17/733,882

(22) Filed: Apr. 29, 2022

(65) Prior Publication Data

US 2023/0350096 A1 Nov. 2, 2023

(51) Int. Cl.
*E21B 47/06* (2012.01)
*G01V 20/00* (2024.01)
(Continued)

(52) U.S. Cl.
CPC .............. *E21B 47/06* (2013.01); *G01V 20/00* (2024.01); *G06N 3/044* (2023.01); *G06N 3/045* (2023.01); *G06N 3/08* (2013.01); *E21B 2200/22* (2020.05)

(58) Field of Classification Search
CPC .......... E21B 47/00; E21B 47/06; E21B 49/00; E21B 2200/22; G01V 20/00; G06N 3/044;
(Continued)

(56) References Cited

U.S. PATENT DOCUMENTS 8,271,247 B2 * 9/2012 Davidson ................ E21B 49/00 703/10
10,012,748 B2 7/2018 Gupta et al.
(Continued)

FOREIGN PATENT DOCUMENTS

CA 3177867 A1 11/2021
CN 113435662 A 9/2021
(Continued)

OTHER PUBLICATIONS

Razak, S., et al. "Transfer Learning with Recurrent Neural Networks for Long-term Production Forecasting in Unconventional Reservoirs" Unconventional Resources Tech. Conf. (2021) available from <https://onepetro.org/URTECONF/proceedings/21URTC/21URTC/D011S001R002/465423> (Year: 2021).*
(Continued)

*Primary Examiner* — Jay Hann
(74) *Attorney, Agent, or Firm* — Renner, Otto, Boisselle & Sklar, LLP

(57) ABSTRACT

A computer-implemented method for generating a trained, graph-based neural network model for use in prediction of a time-evolution of a pressure profile of a hydrocarbon reservoir of a hydrocarbon field is described. Geologic reservoir information and an initial spatial pressure profile are obtained for one or more reservoirs of the hydrocarbon field. Based on the geologic reservoir information and the initial spatial pressure profile, a computational sector model is generated for a selected sector comprising a plurality of modelling cells. Using the computational sector model, simulated spatiotemporal pressure profiles for the selected sector is generated wherein each spatiotemporal pressure profile is generated for a corresponding injection production plan. The graph-based neural network model for the selected sector is initialized using the geologic reservoir information and the initial spatial pressure profile, and can then be
(Continued)

trained using the simulated spatiotemporal pressure profiles for the selected sector.

10 Claims, 6 Drawing Sheets

(51) Int. Cl.

| | |
|---|---|
| ***G06N 3/044*** | (2023.01) |
| ***G06N 3/045*** | (2023.01) |
| ***G06N 3/08*** | (2023.01) |

(58) Field of Classification Search

CPC ........ G06N 3/045; G06N 3/08; G06N 3/0455; G06N 3/09; G06N 3/092; G06N 3/042; G06F 30/27; G06F 30/28; G06F 2113/08; G06F 2119/14

See application file for complete search history.

(56) References Cited

U.S. PATENT DOCUMENTS

| | | | | |
|---|---|---|---|---|
| 11,401,801 | B2 * | 8/2022 | Heidari | E21B 41/00 |
| 11,409,015 | B2 * | 8/2022 | Maucec | G01V 1/46 |
| 11,441,404 | B2 * | 9/2022 | Madasu | E21B 47/06 |
| 11,715,034 | B2 * | 8/2023 | Al-Nasser | G06N 20/00 703/10 |
| 11,846,175 | B2 * | 12/2023 | Chaki | E21B 47/022 |
| 2021/0049467 | A1 | 2/2021 | Riedmiller et al. | |
| 2021/0087925 | A1 | 3/2021 | Heidari et al. | |
| 2021/0389491 | A1 | 12/2021 | Maucec et al. | |

FOREIGN PATENT DOCUMENTS

| | | | |
|---|---|---|---|
| WO | 2012-015516 | A1 | 2/2012 |
| WO | 2019197613 | A1 | 10/2019 |

OTHER PUBLICATIONS

Tariq, Z., et al. "A systematic review of data science and machine learning applications to the oil and gas industry" J. Petroleum Exploration & Production Tech., vol. 11, pp. 433-4374 (2021) (Year: 2021).*

Harp, D., et al. "On the feasibility of using physics-informed machine learning for underground reservoir pressure management" Expert Systems with Applications, vol. 178, No. 115006 (2021) (Year: 2021).*

Werneck, R., et al. "Data-driven deep-learning forecasting for oil production and pressure" J. Petroleum Science & Engineering, vol. 210, No. 109937 (Dec. 2021) (Year: 2021).*

Tang, H., et al. "Deep Learning-Accelerated 3D Carbon Storage Reservoir Pressure Forecasting Based on Data Assimilation Using Surface Displacement from InSAR" Int'l J. Greenhouse Gas Control, vol. 120; arXiv:2201.08543v2 (preprint Jan. 2022) available from <https://arxiv.org/abs/2201.08543> (Year: 2022).*

Tobias Pfaff et. al, "Learning Mesh-Based Simulation with Graph Networks," International Conference on Learning Representations (ICLR), Jun. 18, 2021.

Madasu Srinath et al.: "Compressing Time-Dependent Reservoir Simulations Using Graph-Convolutional Neural Network G-CNN", Abu Dhabi International Petroleum Exhibition & Conference, Nov. 11, 2019.

Wang Haochen et al.: "An Interpretable Interflow Simulated Graph Neural Network for Reservoir Connectivity Analysis", SPE Journal, vol. 26, No. 04, Feb. 5, 2021, pp. 1636-1651.

European Search Report issued for corresponding European Application No. 23170759. 7, mailed Sep. 11, 2023.

He Bo, "A Study on Artificial Neural Network-based Reservoir Parameter Prediction," Chinese Master's Theses Full-text Database, Harbin Engineering University, Jan. 2007.

* cited by examiner

SYSTEM AND METHOD FOR EFFECTIVE HYDROCARBON RESERVOIR PRESSURE PREDICTION AND CONTROL

TECHNICAL FIELD

The present disclosure relates to neural network-based systems and methods for predicting and controlling hydrocarbon reservoir pressure to optimize hydrocarbon production.

BACKGROUND

Maintaining the reservoir pressure of a hydrocarbon (e.g., natural gas, oil, etc.) reservoir to a reasonable level is paramount to assure the continuity of hydrocarbon production, which ultimately targets to improve hydrocarbon recovery. Here and in the following, reservoir pressure means the pressure of the fluid(s) (e.g., oil, water, separator, etc.) in pores and fractures of the geological formation of the reservoir which corresponds the hydrodynamic energy of the reservoir responsible for causing the fluids to move within the reservoir.

The implementation of a pressure maintenance scheme, generally, includes the drilling of injector wells, where, most commonly, injected fluids for pressure maintenance are water and separator or residue gas. The effectiveness of the pressure maintenance scheme primarily relies on the correctness of the location of the injector wells and the balancing of the rate at which the injected fluid is injected into the reservoir to the rate of hydrocarbon extraction. This is typically called an injection-production plan (IPP) aligned with a given pressure maintenance requirement (PMR) for the hydrocarbon reservoir or a portion thereof (e.g., a sector of the reservoir). The standard way to monitor the reservoir pressure and IPP performance is by measuring well bottom-hole pressure through a gauge under steady state reservoir condition. This operation, generally, requires mobilization of specialized well intervention equipment and a lengthy closure of the producing or injecting well.

Therefore, due the overall logistics cumbersomeness and the voluntarily loss of production, it is practically not possible to acquire the pressure data for all wells at once. Alternatively, reservoir simulation models are used to simulate the production-injection scheme for understanding resultant pressure distribution across different areas. However, the prediction performance of the reservoir models greatly depends on the quality of reservoir model match, which, generally, deteriorates with the sparseness of the available measured pressure data. Moreover, the optimization involves intense reservoir simulations, which usually require substantial time, effort, and computation resources. Therefore, time-constraint decision making is not possible with this methodology. More specifically, to assure adequate reservoir pressure maintenance, the balancing of the IPP is the primary objective function to solve. The following approaches, known in the art, semi-analytically define the IPPs, some of them are discussed below:

Voidage Replacement Ratio (VRR) Management:

VRR is generally considered as a direct indicator for appropriate reservoir pressure maintenance, as it represents the ratio between injected volumes in a specific area of the reservoir over the production volumes withdrawal during the same time step. VRR is usually consider adequate to maintain the reservoir pressure to a desired level. Thereby, engineers divide the reservoir into small sections aerially, generally called sectors, and manipulate the production and injection targets for each sector in a way that the ratio of total injection and withdrawal from each sector stays above 1. However, this methodology comes with a limitation that this approach does not capture the effectiveness of the water injection, which is generally reduced away from the main reservoir section. The estimation for the loss of water injection into the aquifer is quite ambiguous, which requires detailed numerical simulations. This additional work does not offer the practicality needed for day-to-day operations.

Production Systems Optimization (PSO):

Another approach to identify the right balance of the production-injection targets to achieve the desired pressure maintenance is the use of the PSO models, which is more sophisticated than the previous technique. In the PSO workflows, well and surface network models are built with the right level of operational constraints and different production and injection targets are assigned across different wells, the in-built optimizer finds the optimum well production and injection rates that satisfies the require VRR targets. The PSO platform may include several material balances models, representing individual sectors as a tank, which can give mathematical estimation of the individual tank pressure to assess the appropriateness of the production-injection plan. The fast-processing time makes this methodology suitable for the short-term production planning, however, it inherently lacks the areal and vertical granularity of the reservoir model (as it uses average reservoir properties per tank or sector), which hampers the identification of the most impacted areas that may require additional injector well drilling to support the reservoir maintenance scheme. Moreover, keeping the well, surface network and reservoir models up to date is the key to ensure right predictability of the reservoir pressure that requires substantial efforts and time.

Integrated Asset Modeling (IAM):

The integrated Asset Modeling is considered as the holy grail for optimizing the reservoir development schemes, including pressure maintenance; it combines the surface network, well and the full-scale reservoir simulation models through an integrated platform. Different optimization scenarios are run using the integrated asset model to meet the reservoir pressure maintenance target not only in the short term, but also, in the mid-long term as well. Despite all the technical adequacy, this technique cannot be used for the day-to-day optimization work, owing to the massive computation time, which can take up to a few days to complete few optimization scenarios.

Capacitance Resistance Models (CRM):

A CRM is a simple and fast optimization tool to support continuous reservoir management and optimization process, it is built on a material balance and signal processing of resistor-capacitor circuits where each circuit is represented by injector-producer pair per reservoir. The results of this optimization are the connectivity factor calculations that are matched based on the production and injection data for each injector-producer pair. The remaining hydrocarbon maps are used in combination for infill drilling recommendations and optimization. The connectivity of the pairs is analyzed to come up with recommendations on activities for example to redistribute water injection, to reduce the water cycling by conformance treatments. It is important to note that the model works well if there are multiple interruptions in injection history because the matching is based on production reaction to injection rate variation. If production and injection levels does not change during a long time, then the solution might be unstable. Moreover, each injector-producer pair drains certain pore volume, if a new well or new interval (new perforation) is added, then the pore volume is changed. These changes should be accounted in calculations. Therefore, multiple history matching runs are generally needed to obtain a useful CRM model.

US 2021/0049467 relates to a graph neural network system implementing a learnable physics engine for understanding and controlling a physical system. The physical systems discussed in US 2021/0049467 are composed of mechanical bodies coupled by mechanical joints and is represented by static and dynamic graphs. A graph processing neural network processes an input graph e.g., the static and dynamic graphs, to provide an output graph, e.g., a predicted dynamic graph. The graph processing neural network is differentiable and may be used for control and/or reinforcement learning. The conference paper LEARNING MESH-BASED SIMULATION WITH GRAPH NETWORKS by Tobias Pfaff et. al published at the International Conference on Learning Representations (ICLR) in 2021 relates to a similar graph neural network system for learning mesh-based simulations using graph neural networks.

Generally, neural networks are machine learning models that employ interconnected layers of nonlinear processing units to predict an output for a received input. Some neural networks include hidden layers in addition to an output layer. The output of each (hidden) layer is used as input to the next layer in the network, i.e., the next hidden layer or the output layer. Each layer of the network generates an output from a received input in accordance with current values of a respective set of network parameters (processing unit connection weights, activation function parameters, etc.). As discussed in detail in the prior art references mentioned above, some neural networks represent and process graph structures comprising nodes connected by edges. The graphs may be multigraphs in which nodes may be connected by multiple edges. The nodes and edges may have associated node features and edge features. These may be updated using node update functions and edge update functions, which may be implemented by conventional neural networks such as a multi-layer perceptron (MLP). Training such a graph-based neural network model e.g., via supervised learning using a training set results-inter alia—in determining the network parameters of the neural networks implementing the node and edge update functions and/or the function of a graph encoder as accurate as possible.

SUMMARY

This specification describes a novel neural network system and methodology that can be implemented as computer programs on one or more computers in one or more locations for processing data representing spatiotemporal dynamics of a hydrocarbon reservoir associated with one or more extraction wells and one or more injection wells. The system and methodology can be used to optimize the performance of the pressure maintenance scheme by leveraging the strength of advance machine learning techniques to forecast the pressure distribution across different areas of the reservoirs without the need to run a conventional full-scale reservoir model which would require much larger computational resources.

Thus, in one aspect, the present disclosure relates to a computer-implemented method for generating a trained, graph-based neural network model (GNNM) for use in prediction of a time-evolution of a pressure profile of a hydrocarbon reservoir of a hydrocarbon field, the method comprising, obtaining geologic reservoir information and an initial spatial pressure profile for one or more reservoirs of the hydrocarbon field; generating, based on the geologic reservoir information and the initial spatial pressure profile, a computational sector model for a selected sector comprising a plurality of modelling cells forming a grid or mesh, generating, using the computational sector model, a training set of simulated spatiotemporal pressure profiles for the selected sector, each spatiotemporal pressure profile being generated for a corresponding training injection production plan (TIPP), initializing the GNNM for the selected sector using the geologic reservoir information and the initial spatial pressure profile for the one or more reservoirs of the hydrocarbon field and training the GNNM using the training set of simulated spatiotemporal pressure profiles for the selected sector.

For instance, the selected sector may correspond to a relatively small sub-portion of the hydrocarbon reservoir having an area of roughly 1 or a few km2.

Generating a training set used for neural network training only for such a sector and not the whole reservoir substantially reduces computational effort for both training set generation and for training of the GNNM. It is a key insight of the present disclosure that typically the most relevant geological characteristics of a given hydrocarbon reservoir do not vary substantially across the whole reservoir. In addition, fluid properties are even less dynamic across the extend of a hydrocarbon reservoir. As a consequence, reservoir pressure and fluid dynamics relevant for hydrocarbon production associated with a given IPP are also more or less universal across the reservoir. Thus, as will become apparent in more detail below, a sector GNNM trained for a small sector of a much larger hydrocarbon reservoir can reliably be generalized to the whole reservoir with high fidelity.

Some implementations may further comprise obtaining spatiotemporal pressure profiles from a history-matched reservoir simulation model of the hydrocarbon field, wherein the initial spatial pressure profile for the selected sector is obtained from the spatiotemporal pressure profiles obtained from the history-matched reservoir simulation model of the hydrocarbon field.

For instance, the training set may comprise more than 103 or more than 104 spatiotemporal pressure profiles for the selected sector, wherein each spatiotemporal pressure profile corresponds to a different TIPP and wherein each spatiotemporal pressure profile comprises a time series of more than 103 or 104 spatial pressure profiles for the selected sector. Alternatively or additionally a history-matched reservoir simulation model may provide geologic characteristics of the hydrocarbon reservoir and may allow to extract a time series of three-dimensional reservoir pressure profiles for each injection-production plan.

In some implementations, the GNNM may comprises one or more graph processing units configured to process input graphs to obtain output graphs, each having a graph structure having a plurality of nodes and edges, wherein an input graph represents global reservoir parameters, IPP parameters as well as the spatiotemporal pressure profile of the selected sector at a time t and the output graph represents the global reservoir parameters and the spatiotemporal pressure profile of the selected sector at a time $t+\Delta t$.

For instance, during training, each of the different time series of the spatial pressure profiles of the training set may be used to generate pairs of an input graph and a ground truth output graph. For instance, when the input graph corresponds to time step N of the time series, the corresponding ground truth output graph corresponds to time step N+1. The difference between the estimated output graph obtained by the GNNM in response to the input graph and the corresponding ground truth output graph can be used as cost function for supervised learning of the GNNM.

Further, in some implementations, initializing the GNNM may comprise generating a directional derivative graph and concatenating it with the input graph to form a gradient graph.

Some implementations may further comprise developing a recurrent graph network (RGN) that combines the gradient graph with spatiotemporal pressure profiles obtained from a history-matched reservoir simulation model of the hydrocarbon field; and optimizing the RGN by minimizing a sum of a difference between spatial-temporal pressure profiles predicted using the GNNM to a ground truth spatial-temporal pressure distribution.

The present disclosure also relates to a corresponding computing system comprising: an interface subsystem or circuitry, a processing subsystem or circuitry coupled to a memory subsystem or circuitry and configured to carry out the steps of the methods discussed above.

The present disclosure further relates to a non-transitory computer readable medium storing instructions of a computer program that when executed by one or more computers cause the one or more computers to carry out the methods and to implement the computing systems as discussed above.

In a further aspect, the present disclosure relates to a computer-implemented method for controlling reservoir pressure of a hydrocarbon reservoir of a hydrocarbon field, comprising, obtaining a sector graph-based neural network model (sector GNNM), trained for predicting a spatiotemporal pressure profile of a selected sector of the hydrocarbon reservoir; generalizing, based at least in part on a measured pressure profile of the hydrocarbon reservoir, the sector GNNM to a reservoir GNNM for the hydrocarbon reservoir, obtaining a current injection-production plan, CIPP, associated with the hydrocarbon reservoir, predicting, using the reservoir GNNM and the CIPP, a pressure profile of the hydrocarbon reservoir and adjusting, based on the predicted pressure profile of the hydrocarbon reservoir, the CIPP to optimize hydrocarbon extraction from the hydrocarbon reservoir.

For instance, the trained sector GNNM may be obtained via one of the methods discussed above. Further, the sector GNNM and the reservoir GNNM may comprise a mesh-graph neural network using an encoder-processor-decoder architecture similar to the one discussed in the prior art references cited above.

Some implementations may further comprise, obtaining a second reservoir GNNM comprising different network parameters (e.g., a different graph structure, different features or both) than the first reservoir GNNM, calculating, based at least in part on a set of measured spatiotemporal reservoir pressure profiles of the hydrocarbon reservoir, a reliability metric for the first and second reservoir GNNM and selecting, based on the reliability metric, the first or the second reservoir GNNM for predicting the reservoir pressure profile of the hydrocarbon reservoir. For example, a directional derivative graph (DDG) can be developed such that it efficiently learns the local representations by aggregating neighboring node information for the second reservoir GNNM. For instance, the DDG graph may learn the representation of the gradients on the edges and of the Laplacian on the nodes, where the parameters to create those operators are learnable weights. In other words, the second reservoir GNNM features are converted and incorporated into a DDG. In some implementations, Laplacian and/or finite difference based spatial gradient information may be used. Later, the second reservoir GNNM may be replaced by a concatenated graph of the DDG and the original input graph Further in some implementations, adjusting the CIPP may further comprise calculating, based at least in part on the predicted pressure profile of the hydrocarbon reservoir, an average reservoir pressure, ARP, for one or more sectors of the hydrocarbon reservoir and comparing the ARP for the one or more sectors with a pressure maintenance requirement, PMR, for the one or more sectors corresponding to a reservoir exploitation plan and adjusting operational parameters of the CIPP if the difference between the ARP and the PMR is larger than a threshold value or maintaining operational parameters of the CIPP if the difference between the ARP and the PMR is smaller or equal than the threshold value.

In some embodiments, the updated operational parameters of the CIPP can then be sent to the corresponding injection and extraction wells for execution (e.g., adjustment of injection or extraction flow rate).

In some implementations, adjusting operational parameters of the CIPP may further comprise developing reward based artificial intelligence technique (e.g., a reinforcement learning model, a genetic algorithm or similar) using the CIPP as an initial input and using the reinforcement model to optimize the operational parameters of the CIPP such that the difference between the ARP and the PMR becomes smaller than the threshold value.

The present disclosure also relates to a corresponding computing system comprising: an interface subsystem or circuitry, a processing subsystem or circuitry coupled to a memory subsystem or circuitry and configured to carry out the steps of the methods discussed above.

The present disclosure further relates to a non-transitory computer readable medium storing instructions of a computer program that when executed by one or more computers cause the one or more computers to carry out the methods and to implement the computing systems as discussed above. Further, the present disclosure also provides a non-transitory computer readable medium storing a GNNM trained as discussed above.

The methods systems and computer programs provided by the present disclosure allow to efficiently predict a pressure profile of a target area using pressure profiles from previously history matched reservoir models and reservoir surveillance data almost instantly using trained GNNMs that reliably generalize to whole hydrocarbon reservoirs. As a result, the decisions for production optimization can be made essentially in real-time, which could lead to the automation of the complete process by using technologies like centralized edge computing and quasi-autonomous hydrocarbon extraction and fluid injection technology. As a result, hydrocarbon field operating efficiency is substantially improved, and the sustainability of reservoir health can be assured by implementing a proper pressure maintenance strategy.

SHORT DESCRIPTION OF THE FIGURES

Various aspects of the present disclosure are described in more detail in the following by reference to the accompanying figures. These figures show:

DETAILED DESCRIPTION OF SOME EXEMPLARY EMBODIMENTS

In the following, some exemplary embodiments of the present disclosure described in more detail, with reference to exemplary processes and computing systems. Naturally, the computing systems provided by the present disclosure may employ standard hardware components (e.g., a set of on-premises edge computing hardware and/or cloud-based computing resources connect to each other via conventional wired or wireless networking technology). In some implementations, application-specific hardware (e.g., circuitry for training GNNMs and/or circuitry for executing a trained GNNM for reservoir prediction) may also be employed. Further, such computing systems are configured to execute software instructions (e.g., retrieved from collocated or remote memory circuitry) to execute the computer-implemented methods discussed in the preceding section.

While specific feature combinations are described in the following paragraphs with respect to the exemplary embodiments of the present disclosure, it is to be understood that not all features of the discussed embodiments have to be present for realizing the disclosure, which is defined by the subject matter of the claims. The disclosed embodiments may be modified by combining certain features of one embodiment with one or more technically and functionally compatible features of other embodiments. Specifically, the skilled person will understand that features, components, processing steps and/or functional elements of one embodiment can be combined with technically compatible features, processing steps, components and/or functional elements of any other embodiment of the present disclosure as long as covered by the invention as specified by the appended claims.

Moreover, the various embodiments discussed herein can be implemented in hardware, software or a combination thereof. For instance, the various modules of the systems disclosed herein may be implemented via application specific hardware components such as application specific integrated circuits, ASICs, and/or field programmable gate arrays, FPGAs, and/or similar components and/or application specific software modules being executed on multi-purpose data and signal processing equipment such as CPUs, DSPs and/or systems on a chip, SOCs, or similar components or any combination thereof.

For instance, the various computing (sub)-systems discussed herein may be implemented, at least in part, on multi-purpose data processing equipment such as edge computing servers. Similarly, GNNM training subsystems or processes discussed herein may be implemented, at least in part, on multi-purpose cloud-based data processing equipment such as a set of cloud-severs.

Figure 1:
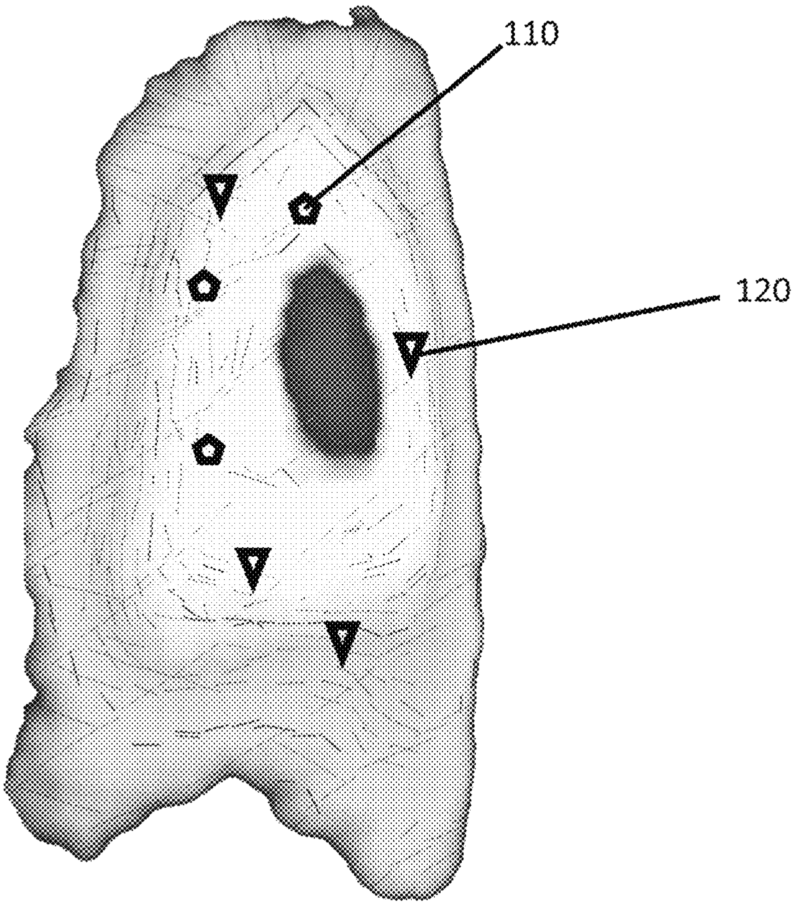
FIG. 1 shows a pressure map of an examplary hydrocarbon field comprising multiple extraction and injection wells

FIG. 1 shows a coarse-grained two-dimensional pressure map of an examplary hydrocarbon field comprising multiple extraction and injection wells 110 distributed across several hydrocarbon reservoirs of the hydrocarbon field. The pressure map may be obtained by numerical fitting procedure based on sparse pressure measurements and a computational model of the geological and fluid dynamical properties of the hydrocarbon reservoirs comprising the hydrocarbon field.

Figure 2:
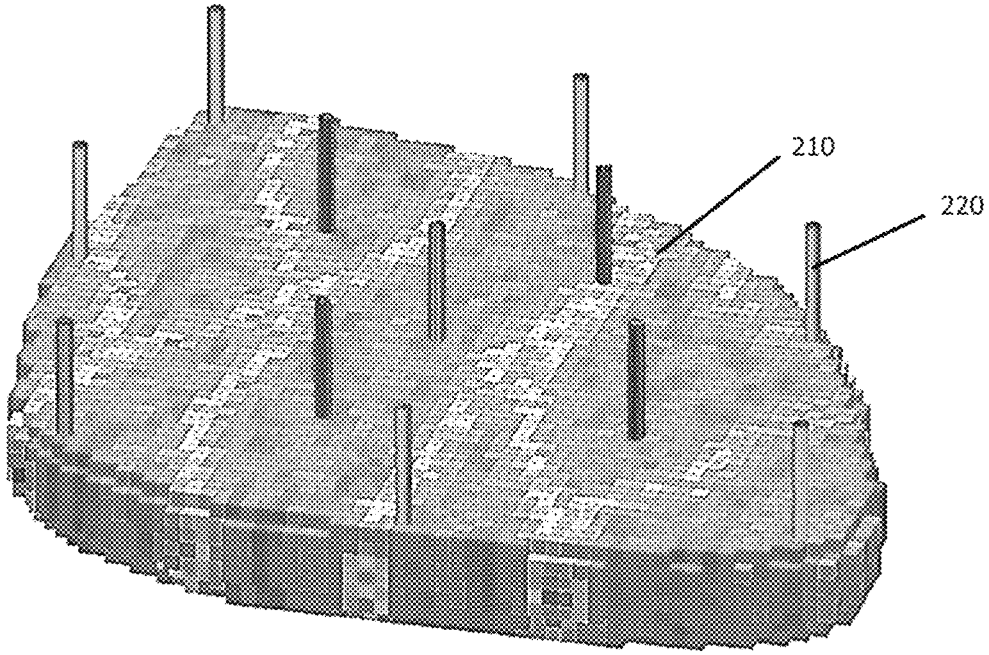
FIG. 2 shows a three-dimensional computational sector model for a hydrocarbon reservoir comprising a grid of modelling cells and multiple extraction and injection wells corresponding to a given IPP.

FIG. 2 shows a finer grained three-dimensional computational sector model for a sector of one of the hydrocarbon reservoirs of a hydrocarbon field such as the field shown in FIG. 1. The sector model comprises a plurality of modelling cells 210 arranged in three-dimensional grid typically covering an area of a few km2 and a depth of a few 100 m as well as multiple extraction and injection wells 220 corresponding to a given IPP. An IPP for a sector or reservoir is specified by the locations of the extraction and injection wells and their respective fluid extraction and injection rates. For each instant in time, each cell of the sector model is associated with a pressure value (e.g., expressed in Pascal or Atmospheres) and each connection between a pair of adjacent cells is assigned a fixed permeability or transmissivity value. Typically, permeability is measured in Darcies. One Darcy is the permeability that allows a fluid of 1 cP viscosity to flow at a velocity of 1 cm/sec for a pressure drop of 1 atm/cm. In some implementations, other parameters such as movable oil, water and gas information may also be incorporated.

Moreover, typically, such a sector model merely covers only a small portion (e.g., below 10% or below 5%) of the total volume of a typical hydrocarbon reservoir which typically exhibits quite homogenous geological characteristics such as rock porosity, permeability, etc. As discussed herein, to obtain a training set of simulated spatiotemporal pressure profiles, such a cell-based sector model is simulated for a large number (e.g., 103 or 104) of training IPPs (TIPPs) to generate, for each TIPP, a time series of 103 or 104 simulated spatial pressure profiles that, as discussed above, can be used for training neural network parameters (e.g., the weights and activation functions of the MLPs forming implementing the edge and node update functions of the GNNM).

Figure 3:
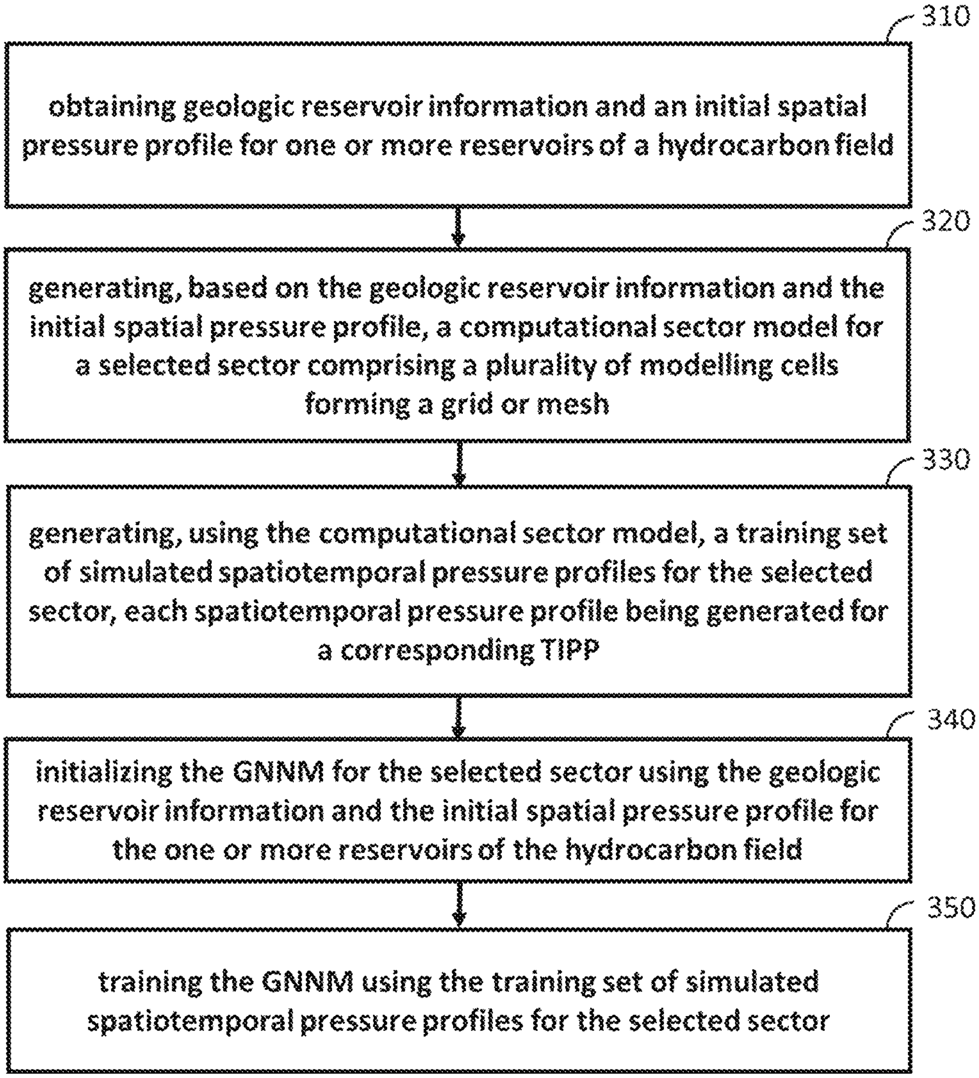
FIG. 3 shows a process for generating a trained GNNM for use in prediction of a time-evolution of a pressure profile of a hydrocarbon reservoir of a hydrocarbon field according to some aspects of the present disclosure.

FIG. 3 shows an exemplary process for generating a trained GNNM for use in prediction of a time-evolution of a pressure profile of a hydrocarbon reservoir of a hydrocarbon field according to some aspects of the present disclosure. The process starts at step 310 where a computing system such as discussed above (for an example see FIG. 6 below) obtains geologic reservoir information and an initial spatial pressure profile for one or more reservoirs of a hydrocarbon field. For instance, such information may be derived from a history-matched reservoir simulation model of the hydrocarbon field and the initial spatial pressure profile may be obtained from spatiotemporal pressure profiles obtained from the history-matched reservoir simulation model of the hydrocarbon field.

At step 320, based on the geologic reservoir information and the initial spatial pressure profile, a computational sector model for a selected sector comprising a plurality of modelling cells forming a grid or mesh as discussed in more detail with reference to FIG. 2 above.

At step 330, the computing system generates, using the computational sector model, a training set of simulated spatiotemporal pressure profiles for the selected sector, each spatiotemporal pressure profile being generated for a corresponding training injection production plan (TIPP). For instance, the computing system may use conventional reservoir simulation software such as the Intersect reservoir simulation tool from Schlumberger for simulating the time evolution of the cells of the computational sector model for a plurality of different TIPs to generate the training set. In this manner a training set may be generated that comprises more than 103 or more than 104 spatiotemporal pressure profiles for the selected sector, wherein each spatiotemporal pressure profile corresponds to a different TIPP and wherein each spatiotemporal pressure profile comprises a time series of more than 103 or 104 spatial pressure profiles for the selected sector.

At step 340, the computing system initializes the GNNM for the selected sector using the geologic reservoir information and the initial spatial pressure profile for the one or more reservoirs of the hydrocarbon field. As discussed on more detail above, the GNNM may comprises one or more graph processing units configured to process input graphs to obtain output graphs, each having a graph structure having a plurality of nodes and edges, wherein an input graph represents global reservoir parameters and the spatiotemporal pressure profile of the selected sector at a time t and the output graph represents the global reservoir parameters and the spatiotemporal pressure profile of the selected sector at a time t+Δt. For instance, the GNNM may comprises a mesh-graph neural network model using an encoder-processor-decoder architecture similar to the one discussed in the prior art mentioned above.

At step 350, the computing system trains the GNNM using the training set of simulated spatiotemporal pressure profiles for the selected sector. Training can for instance be carried out as described in the prior art references mentioned above. After training is completed, the trained GNNM can be stored and/or duplicated and distributed for later use, i.e., for predicting and controlling reservoir pressure of a hydrocarbon reservoir as discussed above and with reference to FIG. 4 below.

Figure 4:
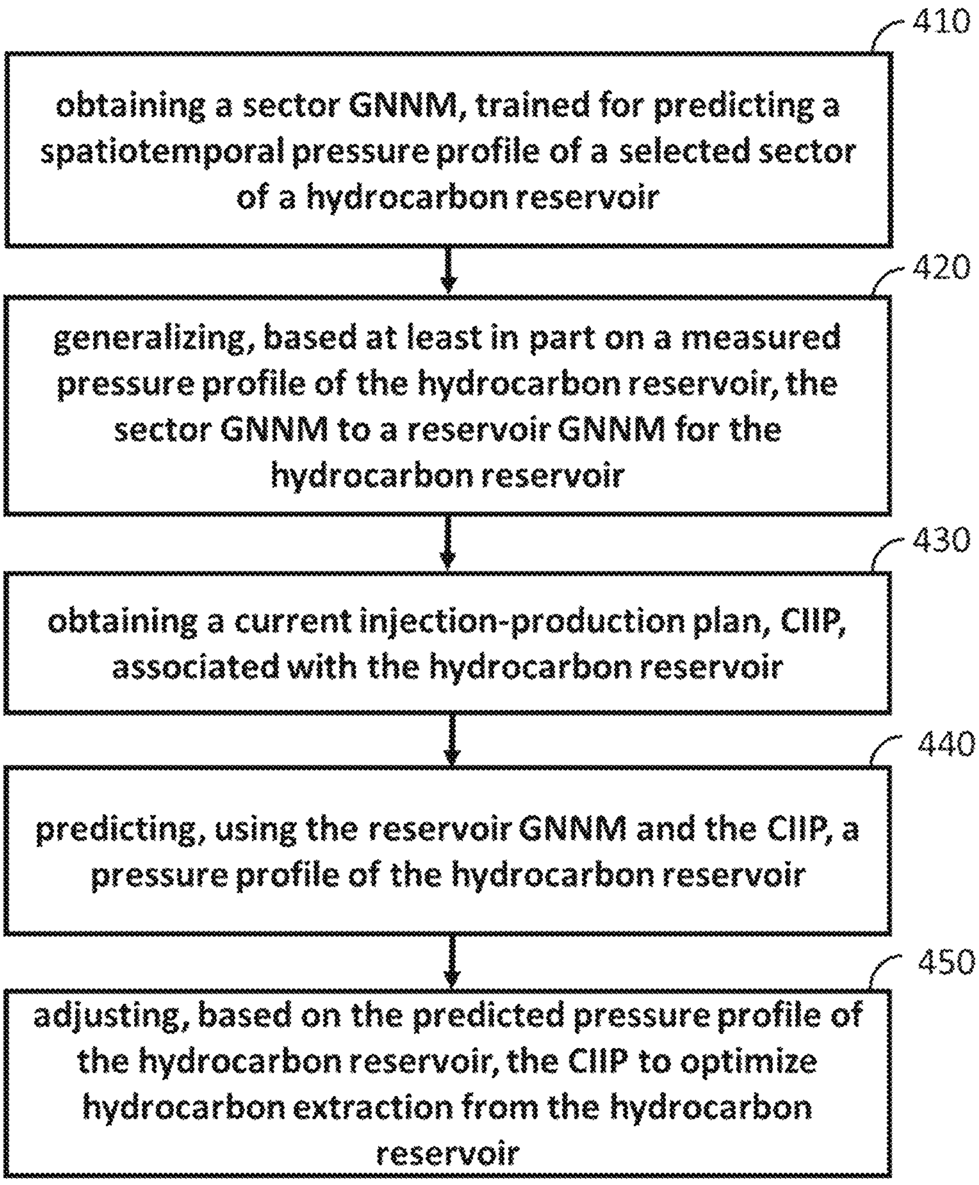
FIG. 4 shows a process for controlling reservoir pressure of a hydrocarbon reservoir of a hydrocarbon field according to some aspects of the present disclosure.

FIG. 4 shows a process for controlling reservoir pressure of a hydrocarbon reservoir of a hydrocarbon field according to some aspects of the present disclosure.

The process starts at step 410 where a computing system such as discussed above (for an example see FIG. 7 below) obtains a sector GNNM, trained for predicting a spatiotemporal pressure profile of a selected sector of a hydrocarbon reservoir. For instance, such a GNNM may be generated as discussed above.

At step 420, the computing system generates, based at least in part on a measured pressure profile of the hydrocarbon reservoir, the sector GNNM to a reservoir GNNM for the hydrocarbon reservoir. The generalization may also involve considering further information on the hydrocarbon reservoir that was not yet used for generating the sector GNNM, such as geologic data, (history-matched) simulation data, past measurement data and the like.

At step 430, the computing system obtains a current injection-production plan, CIPP, associated with the hydrocarbon reservoir and at step 440 it predicts, using the reservoir GNNM and the CIPP, a pressure profile of the hydrocarbon reservoir. At step 450, the computing system adjusts, based on the predicted pressure profile of the hydrocarbon reservoir, the CIPP to optimize hydrocarbon extraction from the hydrocarbon reservoir.

As discussed above, typically, the geologic and fluid dynamic properties do not vary substantially across the different sectors of a hydrocarbon reservoir. Thus, the trained network parameters (e.g., neural network parameters of the node and edge update functions and/or of the encoder) of the GNNM can be used to generate a large scale GNNM for the hydrocarbon reservoir.

Figure 5:
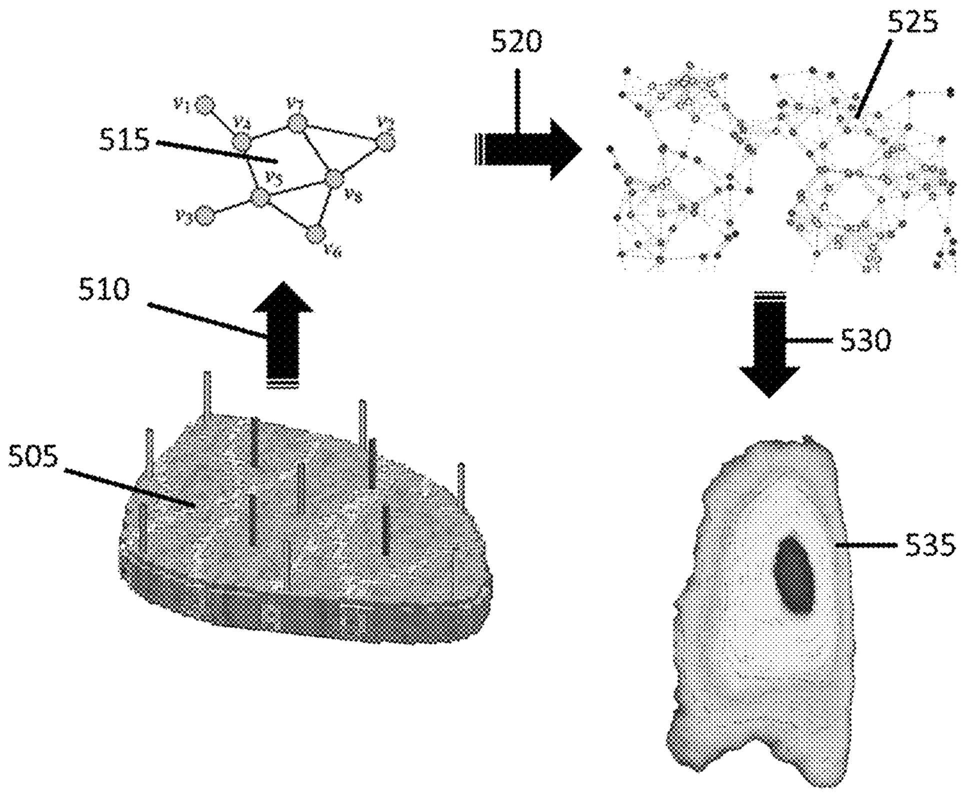
FIG. 5 illustrates how a trained sector GNNM for a given hydrocarbon reservoir can be generalized to a GNNM for the hydrocarbon reservoir

This aspect is further illustrated in FIG. 5 that shows how a small-scale, trained sector GNNM 515 can be generated 510 using a small-scale computational model of a single sector of a hydrocarbon reservoir. The sector GNNM is then generalized 520 to a large-scale reservoir GNNM 525 which can be used to predict 530—as discussed above-time evolution of the pressure profile 535 of the whole hydrocarbon reservoir.

Figure 6:
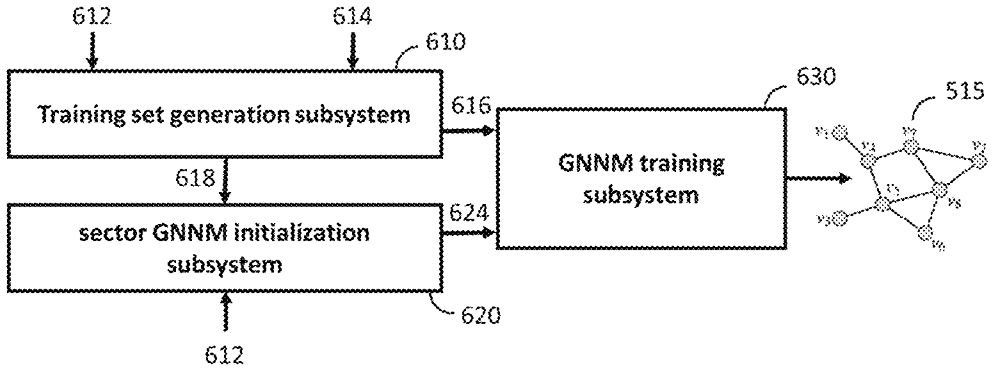
FIG. 6 shows a computing system for generating a trained sector GNNM for use in prediction of a time-evolution of a pressure profile of a hydrocarbon reservoir of a hydrocarbon field according to some aspects of the present disclosure.

FIG. 6 shows an overview of a computing system for generating a trained sector GNNM 515 for use in prediction of a time-evolution of a pressure profile of a hydrocarbon reservoir of a hydrocarbon field according to some aspects of the present disclosure and illustrate in FIGS. 3-5 above.

A training set generation subsystem 610 comprises interface, processing and memory circuitry and is configured to obtain geologic reservoir information 612 and an initial spatial pressure profile 614 for one or more reservoirs of a hydrocarbon field. The training set generation subsystem then uses a computational sector model (see FIGS. 2 and 5 above) to generate a training set of spatiotemporal pressure profiles for the selected sector.

A sector GNNM initialization subsystem 620 uses the geologic reservoir information 612 and information about the selected sector or sector model 618 (e.g., size, number of modelling cells and their connectivity, etc.) to initialize a non-trained, sector GNNM 624. Which in turn is then trained by a GNNM training subsystem 630, based on the training set 616 to generate a trained GNNM 515 for the selected sector.

Naturally, the subsystems illustrated in FIG. 6 may be implemented by executing a corresponding computer program on standard computing hardware such as one or more edge or cloud servers.

Figure 7:
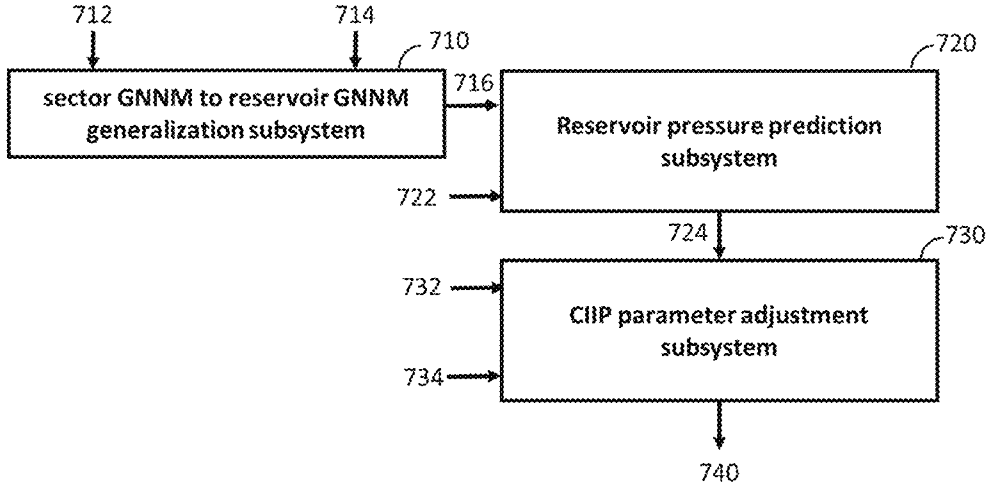
FIG. 7 shows a computing system for controlling reservoir pressure of a hydrocarbon reservoir of a hydrocarbon field according to some aspects of the present disclosure.

FIG. 7 shows a computing system for controlling reservoir pressure of a hydrocarbon reservoir of a hydrocarbon field according to some aspects of the present disclosure and illustrate in FIGS. 3-5 above.

A sector GNNM to reservoir GNNM generalization subsystem 710 that for instance comprises, as discussed above, interface, processing and memory circuitry is configured to obtain a sector GNNM 712, trained for predicting a spatiotemporal pressure profile of a selected sector of a hydrocarbon reservoir and to generalize, based at least in part on a measured pressure profile 714 of the hydrocarbon reservoir, the sector GNNM 712 to a reservoir GNNM 716 for the hydrocarbon reservoir (see also FIG. 5 above). The generalized reservoir GNNM 716 is then input into a reservoir pressure prediction subsystem 730 that uses the trained and generalized reservoir GNNM 716 and a current IPP (CIPP) 722 for predicting a reservoir pressure profile 724.

The reservoir pressure profile 724 is then used by a CIPP parameter adjustment subsystem 730 that is configured to adjust, based on the predicted reservoir pressure profile 724, the parameters of the CIPP to optimize hydrocarbon extraction from the hydrocarbon reservoir.

In some implementations, the computing system may further be configured for obtaining a second reservoir GNNM comprising different network parameters than the first reservoir GNNM for calculating, based at least in part on a set of measured spatiotemporal reservoir pressure profiles of the hydrocarbon reservoir, a reliability metric for the first and second reservoir GNNM and for selecting, based on the reliability metric, the first or the second reservoir GNNM for predicting the reservoir pressure profile of the hydrocarbon reservoir.

Further, the CIPP parameter adjustment subsystem 730 may be configured for calculating, based at least in part on the predicted pressure profile 724 of the hydrocarbon reservoir, an average reservoir pressure, ARP, for one or more sectors of the hydrocarbon reservoir and for comparing the ARP for the one or more sectors with a pressure maintenance requirement, PMR, 734 for the one or more sectors corresponding to a reservoir exploitation plan and for adjusting operational parameters of the CIPP 740 if the difference between the ARP and the PMR is larger than a threshold value or for maintaining operational parameters of the CIPP if the difference between the ARP and the PMR is smaller or equal than the threshold value.

The CIPP parameter adjustment subsystem 730 may be configured for developing a reward based artificial intelligence technique using the CIPP as an initial input and for using the reward based artificial intelligence technique to optimize the operational parameters of the CIPP such that the difference between the ARP and the PMR becomes smaller than a threshold value.

Naturally, the subsystems illustrated in FIG. 7 may also be implemented by executing a corresponding computer program on standard computing hardware such as one or more edge or cloud servers.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus or circuitry, cause the apparatus or circuitry to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "processing system, apparatus or circuitry" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment.

A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method for generating a trained, graph-based neural network model (GNNM) for use in prediction of a time-evolution of a pressure profile of a hydrocarbon reservoir of a hydrocarbon field, comprising:

obtaining geologic reservoir information and an initial spatial pressure profile for one or more reservoirs of the hydrocarbon field;

generating, based on the geologic reservoir information and the initial spatial pressure profile, a computational sector model for a selected sector comprising a plurality of modelling cells forming a grid or mesh;

generating, using the computational sector model, a training set of simulated spatiotemporal pressure profiles for the selected sector, each spatiotemporal pressure profile being generated for a corresponding training injection production plan (TIPP);

initializing the GNNM for the selected sector using the geologic reservoir information and the initial spatial pressure profile for the one or more reservoirs of the hydrocarbon field; and training the GNNM using the training set of simulated spatiotemporal pressure profiles for the selected sector:

wherein the GNNM comprises one or more graph processing units configured to process input graphs to obtain output graphs, each having a graph structure having a plurality of nodes and edges, wherein an input graph represents global reservoir parameters and the spatiotemporal pressure profile of the selected sector at a time t and the output graph represents the global reservoir parameters and the spatiotemporal pressure profile of the selected sector at a time t+Δt, and wherein initializing the GNNM and/or processing an input graph comprises generating a directional derivative graph and concatenating it with the input graph to form a gradient graph.

2. The method of claim 1, further comprising obtaining spatiotemporal pressure profiles from a history-matched reservoir simulation model of the hydrocarbon field; and wherein the initial spatial pressure profile for the selected sector is obtained from the spatiotemporal pressure profiles obtained from the history-matched reservoir simulation model of the hydrocarbon field.

3. The method of claim 1, wherein graph nodes are associated with a local reservoir pressure for a corresponding cell of the computational sector model and wherein graph edges are associated with a fluid permeability or a fluid transmissivity associated with a connection between adjacent cells of the computational sector model.

4. The method of claim 1, further comprising developing a recurrent graph network (RGN) that combines the gradient graph with spatiotemporal pressure profiles obtained from the history-matched reservoir simulation model of the hydrocarbon field; and optimizing the RGN by minimizing a sum of a difference between spatial-temporal pressure profiles predicted using the GNNM to a ground truth spatial-temporal pressure distribution.

5. The method of claim 1, wherein the training set comprises more than $10^3$ or more than $10^4$ spatiotemporal pressure profiles for the selected sector, wherein each spatiotemporal pressure profile corresponds to a different TIPP and wherein each spatiotemporal pressure profile comprises a time series of more than $10^3$ or $10^4$ spatial pressure profiles for the selected sector; and/or wherein a history-matched reservoir simulation model provides geologic characteristics of the hydrocarbon reservoir and allows to extract a time series of three-dimensional reservoir pressure profiles for each injection-production plan.

6. Computing system for generating a trained, graph-based neural network model (GNNM) for use in prediction of a time-evolution of a pressure profile of a hydrocarbon reservoir of a hydrocarbon field, comprising:

an interface subsystem or circuitry configured for obtaining geologic reservoir information and an initial spatial pressure profile for one or more reservoirs of the hydrocarbon fields;

a processing subsystem or circuitry coupled to a memory subsystem or circuitry and configured for:

generating, based on the geologic reservoir information and the initial spatial pressure profile, a computational sector model for a selected sector comprising a plurality of modelling cells forming a grid or mesh;

generating, using the computational sector model, a training set of simulated spatiotemporal pressure profiles for the selected sector, each spatiotemporal pressure profile being generated for a corresponding training injection production plan (TIPP);

initializing the GNNM for the selected sector using the geologic reservoir information and the initial spatial pressure profile for the one or more reservoirs of the hydrocarbon field; and training the GNNM using the training set of simulated spatiotemporal pressure profiles for the selected sector;

wherein the GNNM comprises one or more graph processing units configured to process input graphs to obtain output graphs, each having a graph structure having a plurality of nodes and edges, wherein an input graph represents global reservoir parameters and the spatiotemporal pressure profile of the selected sector at a time t and the output graph represents the global reservoir parameters and the spatiotemporal pressure profile of the selected sector at a time t+Δt, and wherein initializing the GNNM and/or input graph processing comprises generating a directional derivative graph and concatenating it with the input graph to form a gradient graph.

7. The computing system of claim 6, wherein the interface subsystem or circuitry is further configured for obtaining spatiotemporal pressure profiles from a history-matched reservoir simulation model of the hydrocarbon field, wherein the initial spatial pressure profile for the selected sector is obtained from the spatiotemporal pressure profiles obtained from the history-matched reservoir simulation model of the hydrocarbon field.

8. The computing system of claim 6, wherein graph nodes are associated with a local reservoir pressure for a corresponding cell of the computational sector model and wherein graph edges are associated with a fluid permeability or a fluid transmissivity associated with a connection between adjacent cells of the computational sector model.

9. The computing system of claim 6, wherein the processing subsystem or circuitry is further configured for:

developing a recurrent graph network (RGN) that combines the gradient graph with spatiotemporal pressure profiles obtained from the history-matched reservoir simulation model of the hydrocarbon field; and optimizing the RGN by minimizing a sum of a difference between spatial-temporal pressure profiles predicted using the GNNM to a ground truth spatial-temporal pressure distribution.

10. The computing system of claim 6, wherein the training set comprises more than $10^3$ or more than $10^4$ spatiotemporal pressure profiles for the selected sector, wherein each spatiotemporal pressure profile corresponds to a different TIPP and wherein each spatiotemporal pressure profile comprises a time series of more than $10^3$ or $10^4$ spatial pressure profiles for the selected sector; and/or wherein a history-matched reservoir simulation model provides geologic characteristics of the hydrocarbon reservoir and allows to extract a time series of three-dimensional reservoir pressure profiles for each injection-production plan.

* * * * *